(12) United States Patent
Palanchon et al.

(10) Patent No.: US 9,780,421 B2
(45) Date of Patent: Oct. 3, 2017

(54) CONFORMAL HEAT EXCHANGER FOR BATTERY CELL STACK

(75) Inventors: Herve Palanchon, Cologne (DE); Mark S. Kozdras, Oakville (CA); Michael A. Martin, Hamilton (CA); John Burgers, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 503 days.

(21) Appl. No.: 13/014,988

(22) Filed: Jan. 27, 2011

(65) Prior Publication Data

US 2011/0189525 A1    Aug. 4, 2011

Related U.S. Application Data

(60) Provisional application No. 61/300,616, filed on Feb. 2, 2010.

(51) Int. Cl.
| | | |
|---|---|---|
| *H01M 10/50* | (2006.01) | |
| *H01M 10/659* | (2014.01) | |
| *H01M 10/615* | (2014.01) | |
| *H01M 10/653* | (2014.01) | |
| *H01M 10/6551* | (2014.01) | |
| *H01M 10/6557* | (2014.01) | |
| *H01M 10/613* | (2014.01) | |

(52) U.S. Cl.
CPC ....... *H01M 10/659* (2015.04); *H01M 10/613* (2015.04); *H01M 10/615* (2015.04); *H01M 10/653* (2015.04); *H01M 10/6551* (2015.04); *H01M 10/6557* (2015.04)

(58) Field of Classification Search
USPC .................................................. 429/120, 148
See application file for complete search history.

(56) References Cited

U.S. PATENT DOCUMENTS 5,165,466 A * 11/1992 Arbabian .......................... 165/4
5,456,994 A   10/1995 Mita
6,087,036 A    7/2000 Rouillard et al.
(Continued)

FOREIGN PATENT DOCUMENTS

DE   10 2007 001 590 A1   7/2008
EP         0935063 A2      8/1999
(Continued)

OTHER PUBLICATIONS

Gene Berdichevsky, Kurt Kelty, JP Straubel and Erik Toomre; The Tesla Roadster Battery System, Tesla Motors, Aug. 16, 2006, pp. 1-5.
(Continued)

*Primary Examiner* — Osei Amponsah
(74) *Attorney, Agent, or Firm* — Marshall & Melhorn, LLC (57) ABSTRACT

A heat exchanger structure for use in a battery unit that comprises a first battery stack comprising a plurality of battery cells and a second battery stack comprising a plurality of battery cells. The heat exchanger structure is disposed between opposing surfaces of the first battery stack and the second battery stack and defines one or more fluid flow passages, the heat exchanger structure being dimensionally compliant to compress under expansion of the first and second battery stacks and expand under subsequent contraction of the first and second battery stacks.

19 Claims, 5 Drawing Sheets

(56) References Cited

U.S. PATENT DOCUMENTS

| | | | |
|---|---|---|---|
| 6,218,038 B1* | 4/2001 | Oko et al. ............... | 429/434 |
| 6,512,347 B1 | 1/2003 | Hellmann et al. | |
| 6,632,560 B1* | 10/2003 | Zhou ............... | H01M 2/1083 180/68.5 |
| 6,709,783 B2* | 3/2004 | Ogata et al. ............... | 429/120 |
| 6,821,671 B2 | 11/2004 | Hinton et al. | |
| 7,291,420 B2 | 11/2007 | Bitsche et al. | |
| 7,297,438 B2 | 11/2007 | Kimoto | |
| 7,316,863 B2 | 1/2008 | Sato | |
| 2006/0049799 A1* | 3/2006 | Hamada ............... | H01M 2/1061 320/112 |
| 2006/0115720 A1 | 6/2006 | Kim | |
| 2006/0204840 A1* | 9/2006 | Jeon et al. ............... | 429/152 |
| 2006/0220615 A1 | 10/2006 | Kim | |
| 2006/0246348 A1* | 11/2006 | Hamada et al. ............... | 429/148 |
| 2007/0134550 A1 | 6/2007 | Asahina et al. | |
| 2007/0141453 A1 | 6/2007 | Mahalingam et al. | |
| 2007/0285051 A1 | 12/2007 | Jeon et al. | |
| 2008/0311468 A1 | 12/2008 | Hermann et al. | |
| 2009/0032110 A1 | 2/2009 | Straza | |
| 2009/0301700 A1 | 12/2009 | German et al. | |

FOREIGN PATENT DOCUMENTS

| | | | |
|---|---|---|---|
| EP | 1117138 | A1 | 7/2001 |
| EP | 1143541 | A1 | 10/2001 |
| EP | 1278263 | A2 | 1/2003 |
| EP | 1 610 407 | A1 | 12/2005 |
| EP | 2065963 | A2 | 6/2009 |
| EP | 2355201 | A1 | 8/2011 |
| GB | 2269476 | A | 2/1994 |
| JP | H10-032021 | A | 2/1998 |
| JP | H11223398 | A | 8/1999 |
| JP | 2000-48867 | | 2/2000 |
| JP | 200123702 | A | 1/2001 |
| JP | 2001196103 | A | 7/2001 |
| JP | 2004213922 | A | 7/2004 |
| JP | 2004235110 | A | 8/2004 |
| JP | 2005349955 | A | 12/2005 |
| JP | 2006156406 | A | 6/2006 |
| JP | 2006278334 | A | 10/2006 |
| WO | WO 02/27816 | A1 | 4/2002 |
| WO | WO 03/071616 | A2 | 8/2003 |
| WO | WO 2007/082863 | A1 | 7/2007 |

OTHER PUBLICATIONS

English Abstract and Detailed Description of JP2006278334.
English Abstract and Detailed Description of JP2004235110.
English Abstract and Detailed Description of JPH10032021.
English Abstract and Detailed Description of JP2004213922.
English Abstract and Detailed Description of JP2006156406.
English Abstract and Detailed Description of JPH11223398.
English Abstract and Detailed Description of JP2001196103.

* cited by examiner

CONFORMAL HEAT EXCHANGER FOR BATTERY CELL STACK

This application claims priority to and the benefit of U.S. Provisional Patent Application No. 61/300,616 filed Feb. 2, 2010, the content of which is incorporated herein by reference.

BACKGROUND

This disclosure relates to heat exchangers used to dissipate heat in rechargeable batteries and other electricity producing cells.

Rechargeable batteries such as batteries made up of many lithium-ion cells can be used in many applications, including for example in electric vehicle ("EV") and hybrid electric vehicle ("HEV") applications. Such batteries can generate large amounts of heat that needs to be dissipated.

SUMMARY

According to an example embodiment there is provided a battery unit comprising: a first battery stack comprising a plurality of battery cells and having a first battery stack side; a second battery stack comprising a plurality of battery cells and having a second battery stack side that is spaced apart from and opposing the first battery stack side; and a heat exchanger structure disposed between the first battery stack and the second battery stack and defining one or more fluid flow passages, the heat exchanger structure having a first side contacting the first battery stack side and a second side contacting the second battery stack side, the heat exchanger structure being dimensionally compliant to compress under expansion of the first and second battery stacks and expand under subsequent contraction of the first and second battery stacks.

According to an example embodiment is a battery unit comprising a first battery stack comprising a plurality of battery modules, each of the battery modules housing one or more battery cells, the plurality of battery modules of the first battery stack defining a first battery stack side; a second battery stack comprising a plurality of battery modules, each of the battery modules housing one or more battery cells, the plurality of battery modules of the second battery stack defining a second battery stack side that is spaced apart from and opposing the first battery stack side; and a heat exchanger structure disposed between the first battery stack and the second battery stack and defining one or a plurality of fluid flow passages, the heat exchanger structure having a first side contacting the first battery stack side across a plurality of the battery modules and a second side contacting the second battery stack side across a plurality of the battery modules, the heat exchanger structure being elastically deformable to compress under expansion of the first and second battery stacks and expand under subsequent contraction of the first and second battery stacks.

According to another example embodiment is a heat exchanger structure for use in a battery unit that comprises a first battery stack comprising a plurality of battery cells and a second battery stack comprising a plurality of battery cells. The heat exchanger structure is disposed between opposing surfaces of the first battery stack and the second battery stack and defines one or more fluid flow passages, the heat exchanger structure being dimensionally compliant to compress under expansion of the first and second battery stacks and expand under subsequent contraction of the first and second battery stacks.

According to an example embodiment is a heat exchanger structure for use in an power producing unit that comprises a first stack comprising a plurality of power producing modules defining a first stack side and a second stack comprising a plurality of power producing modules defining a second stack side that is spaced apart from and opposing the first stack side, the heat exchanger structure being disposed between the opposing first stack side and second stack side and having a first side contacting the first stack side across a plurality of the power producing modules and a second side contacting the second stack side across a plurality of the power producing modules, the heat exchanger structure being dimensionally compliant to compress under expansion of the first and second stacks and expand under subsequent contraction of the first and second stacks.

DESCRIPTION OF EXAMPLE EMBODIMENTS

Figure 1:
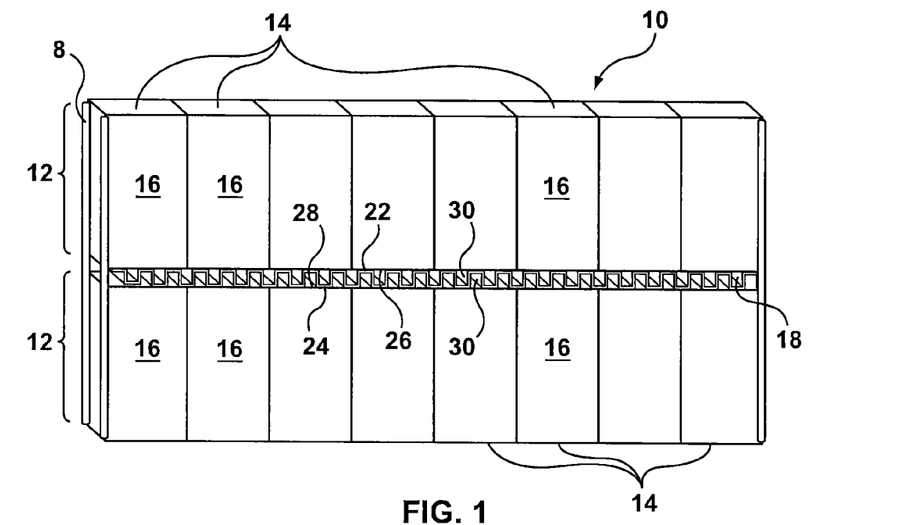
FIG. 1 is an end view of a battery unit according to an example embodiment.

FIG. 1 shows an illustrative example of a rechargeable battery unit 10 according to example embodiments of the invention. The battery unit 10 is made up of battery stacks 12 which in turn are made of battery packs or modules 14 that each house one or more battery cells 16. The illustrated embodiment includes two rectangular box-like stacks 12, each of which is made up of eight horizontally arranged modules 14, with each module housing one or more battery cells 16. The number of stacks 12 in the battery 10, the number of modules 14 in each stack, and the number of battery cells 16 in each module 14 can vary, and the orientation and shape of these components can vary as well from application to application and accordingly the quantities and orientation specified herein are provided as an example of an illustrative embodiment only.

In at least some example embodiments, battery cells 16 are lithium-ion battery cells, however other rechargeable battery cells could be used. In some embodiments, battery cells 16 are prismatic lithium-ion battery cells. In other example embodiments, battery cells 16 have cylindrical or other shapes. In the illustrated embodiment, each module 14 includes a rectangular substantially rigid box-like case housing one or more battery cells 16. By way of non limiting example, 1 to 20 battery cells 16 may be located in each module 14, however more that 20 battery cells may be located in a module 14 in some embodiments. In some embodiments, all of the modules 14 within a stack 12 are substantially identical and the stacks 12 that make up a battery unit 10 are substantially identical. The stacks 12 may be mounted side by side or one above the other in a support frame or rack 8.

According to example embodiments, a heat exchanger 18 that is located between opposing surfaces 26 and 28 of adjacent stacks 12. The contact region between the respective stacks 12 and the intermediate heat exchanger 18 may not be a planar surface, and furthermore may be subject to expansion and contraction during heating and cooling. Accordingly, a heat exchanger 18 that can maintain consistent contact with the geometry of the modules 14 of the stack over a range of temperatures and provide good heat conductivity is desirable in some applications. In this regard, example embodiments relate to a heat exchanger structure that is dimensionally compliant to compress under expansion of the first and second battery stacks and expand under subsequent contraction of the first and second battery stacks such that the heat exchange structure remains in thermal contact with the battery stacks throughout a range of normal battery operating temperatures Referring to FIG. 2, in one example embodiment heat exchanger 18 is formed from a plain convoluted or corrugated fin plate 20 that defines a plurality of air-flow passages 30 between the adjacent battery stacks 12. In the illustrated embodiment, corrugated fin plate 20 has alternating peaks and valleys, the peaks defining spaced apart flat fin surfaces 22 on one side of the fin plate 20 and the valleys defining spaced apart flat fin surfaces 24 on the opposite side of the fin plate 20. The fin plate 20 may for example be formed from stamping or rolling a heat conductive metal such as aluminum, aluminum alloy or stainless steel. The sheet material used to make corrugated fin plate 20 could, by way of non-limiting example, have a thickness in the range of 0.1 mm to 1.0 mm, although thicknesses outside this range may be used in some applications. In some example embodiments, the fin plate 20 has a pitch P of between 5 and 15 mm, and a height between 10 mm to 40 mm, although different fin densities and fin heights could be used in different embodiments. In some example embodiments, the corrugations of the fin plate 20 run parallel to the shorter dimension of the rectangular surface defined by the stack surfaces that the fin plate contacts.

Figure 2:
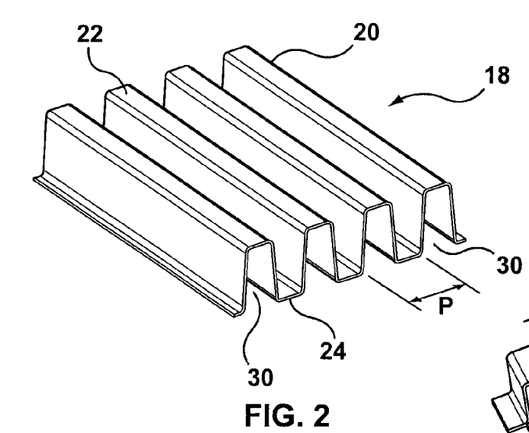
FIG. 2 is a perspective view of a fin plate used as a heat exchanger according an example embodiment.

In at least some example embodiments, the fin plate 20 has a degree of elasticity in that it can be deformed under compression and then return back to its original form or at least partially to its original from as the force compressing it is reduced or removed. In an example embodiment, the battery unit frame 8 is configured to support substantially all or most of the weight of the top stack 12 such that at an ambient temperature the fin plate 20 is held between the stacks 12 with substantially all of the flat fin surfaces 22 on one side of the fin plate 20 being in contact with the surface 26 of one of the module stacks 12 and substantially all of the flat fin surfaces 24 of the opposite side of the fin plate 20 being in contact with the opposing surface of the other module stack 12. As the temperature of the stacks 12 rise during use modules 16 and fin plate 20 are all subject to thermal expansion such that the fin plate 20 is subjected to a greater compressive force between the stack surfaces 26 and 28, causing the fine plate 12 to deform and the contact force between the fin surfaces 22 and 24 and the stack surfaces 26 and 28 to increase, respectively. As the stacks 12 cool, the elasticity of the fin plate 20 keeps the fin surfaces 22 and 24 in contact with respective stack surfaces 26 and 28 as the modules 16 and fin plate 20 contract. Accordingly, in an example embodiment, the fin plate 20 is dimensionally compliant in that it conforms to the opposed stack surfaces 26, 28 (and thus the battery modules 16) during the temperature cycling that the battery unit 10 undergoes during its use allowing for uninterrupted heat transfer during expansion and contraction of the battery stacks.

During use, air or other fluids can pass between the battery stacks 12 through the passages 30 that are defined by the corrugations of the fin plate 20. In some applications, the passing air or fluid can be used to draw heat away from the fin plate 20, and in some applications, the air or fluid flow can be used to add heat to the fin plate 20. In some applications the fin plate 20 can be used to cool the battery unit 10 during certain operating temperatures and heat the battery unit during other operating temperatures.

In some example embodiments at least one side of the fin plate 20 is coated in a brazing material and the fin plate 20 secured to one or both of the battery stacks 12 by brazing. In some example embodiments, a braze shim in the form of a thin plate coated in or formed from braze material is positioned between the opposite sides of the fin plate 20 and the respective stack surfaces to facilitate brazing. In some embodiments, the fin plate 20 is held between the battery stack by compressive forces alone or by connections to battery frame 8 or both. In some applications, fin plate 20 is attached to one or both of the stacks 12 by spot welding or adhesives or by fasteners such as, for example, rivets or bolts or clips.

As noted above, in some configurations the opposed stack surfaces 26, 28 that are defined by the plurality of adjacent battery modules 14 that make up the respective stacks 12 may not be planar surfaces—for example, there could be ridges or other protrusions on the battery modules 14 that extend partially into the area occupied by the fin plate 20. In example embodiments, any ridges or other protrusions that may extend from the opposed surfaces 26, 28 of the respective module 14 casings are aligned with the spaces between the corrugation peak surfaces 22 on one side of the fin plate 20 and the spaces between the corrugation valley surfaces 24 on the opposite side of the fin plate 20.

Figure 3:
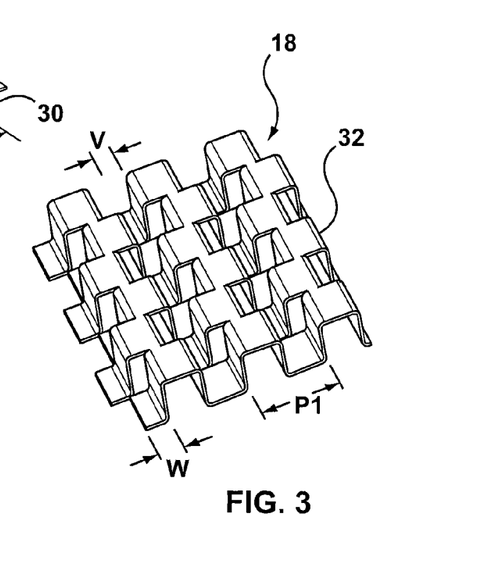
FIG. 3 is a perspective view of a fin plate used as a heat exchanger according to another example embodiment.

The fin plate 20 is one example of a conformal or dimensionally compliant structure that can be used to implement an inter-battery module heat exchanger 18. Other conformal or dimensionally compliant heat exchanger configurations that are also capable of maintaining contact with battery stacks 12 during the battery unit temperature cycles are also possible. By way of example, FIG. 3 shows a further possible conformal fin plate configuration that could be used to implement heat exchanger 18. The fin plate 32 of FIG. 3 is a resilient compressible offset strip fin formed from a metal such as aluminum, aluminum alloy or stainless steel. The sheet material used to make offset strip fin plate 32 could, by way of non-limiting example, have a thickness in the range of 0.1 mm to 1.0 mm, although thicknesses outside this range may be used in some applications. In some example embodiments, the fin plate 32 has a pitch P1 of between 5 and 20 mm, an offset width W of between 2 and 10 mm and a corrugation valley V of between 1.5 and 5 mm, and a height between 10 mm to 40 mm, although different fin densities, pitches, offset widths, valley widths and fin heights could be used in different embodiments.

Figure 4:
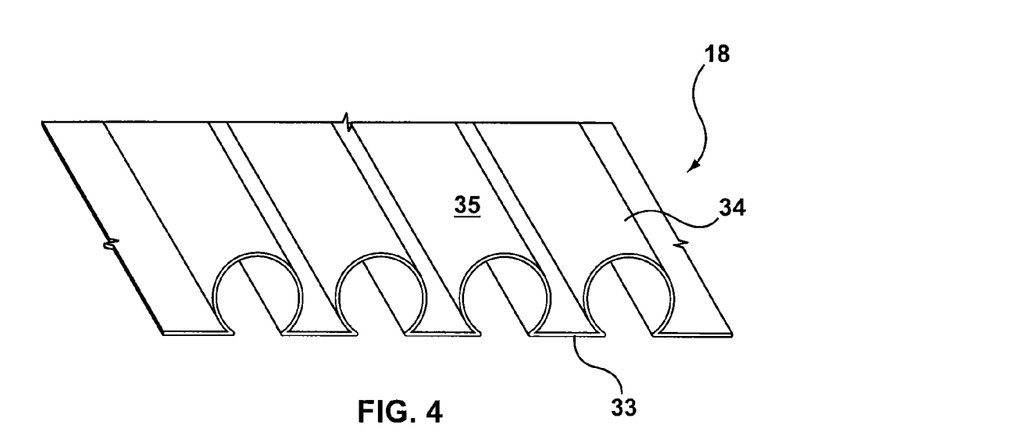
FIG. 4 is a perspective view of a fin plate used as a heat exchanger according to another example embodiment.

Other examples of conformal fin configurations for heat exchanger 18 is illustrated in FIG. 4 which shows a dimensionally compliant "Omega" fin plate 34 that defines rows of parallel semi-cylindrical portions 35 joined by planar portions 33, at least some of the semi-cylindrical portions 35 contacting the first battery stack, side 26 and at least some of the planar portions 33 contacting the second battery stack side 28 to facilitate heat exchange between the fin plate and the first and second battery stacks.

Figure 5:
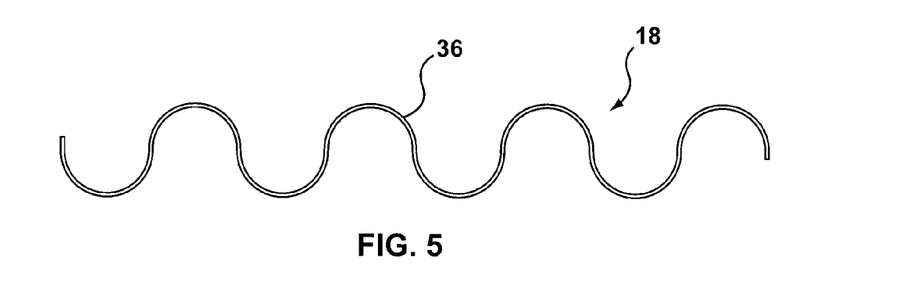
FIG. 5 is an end view of a fin plate used as a heat exchanger according to another example embodiment.

FIG. 5 shows a further alternative in the form of sinusoidal fin plate 36, which in at least some applications can be used in place of the flat-sided fin plate 20 with similar conformal effects. The sinusoidal plate in FIG. 5 is a plain sinusoidal plate, but in some applications and "offset" sinusoidal fin plate could be used which would have a configuration similar to that of FIG. 3, except with sinusoidal undulations rather than square undulations.

Figure 6:
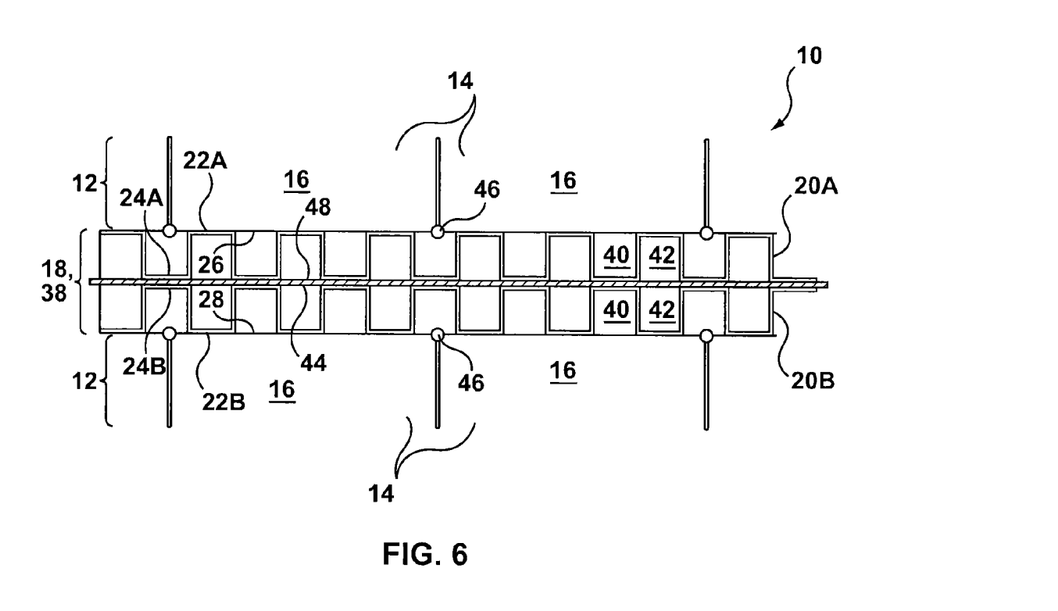
FIGS. 6-8 are each enlarged partial end views of battery units according to alternative example embodiments.

In some example embodiments, combinations of multiple fin plates can be used to implement inter-battery module dimensionally compliant heat exchanger 18. By way of example, FIG. 6 illustrates a double-fin plate assembly 38 for implementing heat exchanger 18. The double-fin plate assembly 38 includes two back-to-back flat-sided fin plates 20A and 20B, which may for example each be identical to fin plate 20.

As shown in FIG. 6 first fin plate 20A and second fin plate 20B are aligned such that their respective valley surfaces 24A, 24B meet at the center of the area between stacks 12 and their respective peak surfaces 22A, 22B contact respective stack surfaces 26, 28 at opposed locations. Such a configuration creates a series of parallel air or fluid passages 40 and 42, with passages 40 being defined between the corrugation valley of plate 20A and stack surface 26 and the corrugation valley of plate 20B and stack surface 28, and passages 42 being defined between the corrugation peaks of plates 20A and 20B. In at least one example embodiment double-fin plate assembly 38 includes a planar intermediate member 44 located between the back-to-back fin plates 20A, 20B such that the valley surfaces 24A and 24B contact opposite sides of the central plate 44. In an example embodiment the planar intermediate member 44 is a plate formed from aluminum, aluminum alloy, stainless steel or other suitable metal and one or both of the first fin plate 20A and second fin plate 20B are secured to its respective side of the planar plate 44 by brazing or spot welding. In some example embodiments, the double fin plate assembly 38 is held together by compressive forces without any brazing or spot welding.

In some example embodiments, any ridges or other protrusions that may extend from the opposed surfaces 26, 28 of the respective module 14 casings are aligned with the passages 40 defined by the corrugation valleys of the fin plates 20A and 20B. By way of example, protruding ribs 46 are shown in FIG. 6 that are aligned with respective corrugation valleys 40. Accordingly, back-to-back fin plate 38 can allow aligned or symmetrical protrusions on the opposed surfaces 26, 28 to be accommodated in corrugation valleys without impacting the heat exchange contact surface at the corrugation peaks.

In some example embodiments, the fin heights through out the fin plate could vary along the length or width of the fin plate to accommodate variations or protrusions along the opposed surfaces of the battery stacks.

Figure 7:
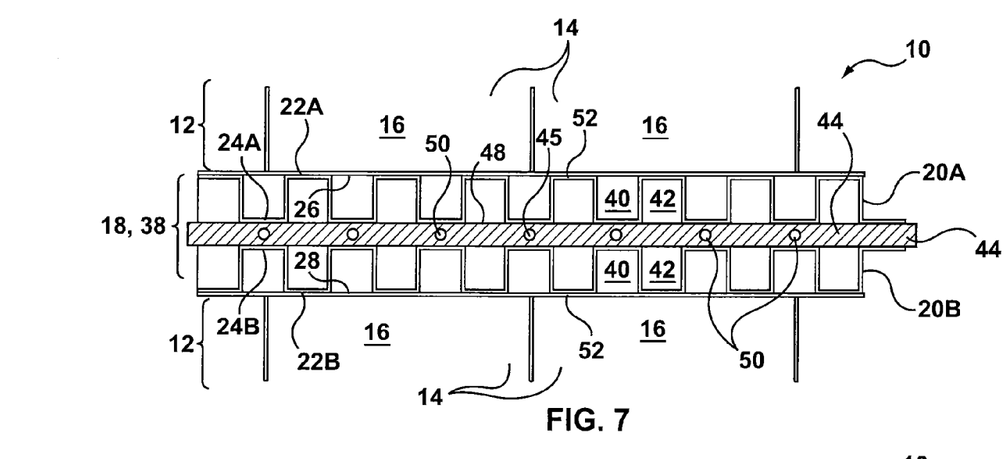
Figure 8:
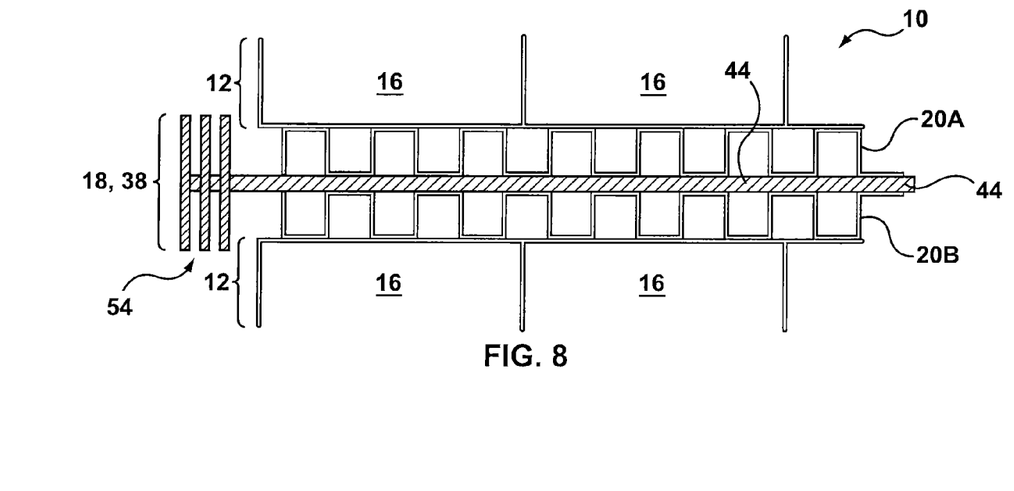

In some example embodiments, the planar intermediate member 44 includes a plate substrate that is coated on one or both sides with a sheet or film heater 48 that can be used to add heat to the fin plates 20A and 20B and battery stacks 12 in cold start up conditions for example. In some example embodiments, the planar intermediate member 44 is formed from a conductive slab or a powder pack that is made from highly thermally conductive graphite or metal. In some example embodiments, planar intermediate member 44 of double fin plate assembly 38 is a cooling plate that includes fluid conduits 50, as shown in FIG. 7, for routing a cooling fluid such as cooled air or cooled liquid though the intermediate member 44. In some example embodiments, film heater 48 is combined with cooling fluid conduits 50, providing an intermediate member 44 that can be used to actively heat or actively cool the double fin plate assembly 38 as required at different stages in a battery operating cycle. In some example embodiments the intermediate member 44 encloses a phase change material 45 such as organic wax or inorganic salts that changes phase at a desired operating temperature to draw heat energy away from plates 20A, 20B. In some example embodiments, the planar intermediate member 44 is formed from a graphite slab or a graphite powder pack. In some example embodiments, for example where intermediate member 44 is a graphite slab or graphite pack, end fins 54 such as shown in FIG. 8 could be attached to ends of the intermediate member 44 to extend beyond the outer edges of the battery stacks 12 to draw heat out of the double plate fin assembly 38. End fins 54 could for example include an aluminum tube having one end embedded into a graphite slab or graphite pack and an extending end with radial fins. In some example embodiments conduits similar to conduits 50 discussed above filled with such a phase change material and be embedded in intermediate member 44. In some example embodiments, the use of phase change materials and active heating or cooling systems can be combined in intermediate member 44. Turning again to FIG. 7, in some example embodiments, an intermediate material 52 such as graphite powder coating or other lubricant coating may be provided on the surfaces of the fin plates 20A, 20B that contact the battery stack surfaces 26, 28 in order to reduce abrasion between the fin surface and the stack surfaces and enhance heat transfer at the fin/stack interfaces. In some example embodiment, intermediate material 52 may be an electrically non-conductive but thermally conductive material to electrically isolate the fin plate but still maintain thermal contact between the fin plate and the battery stack(s).

Figure 9:
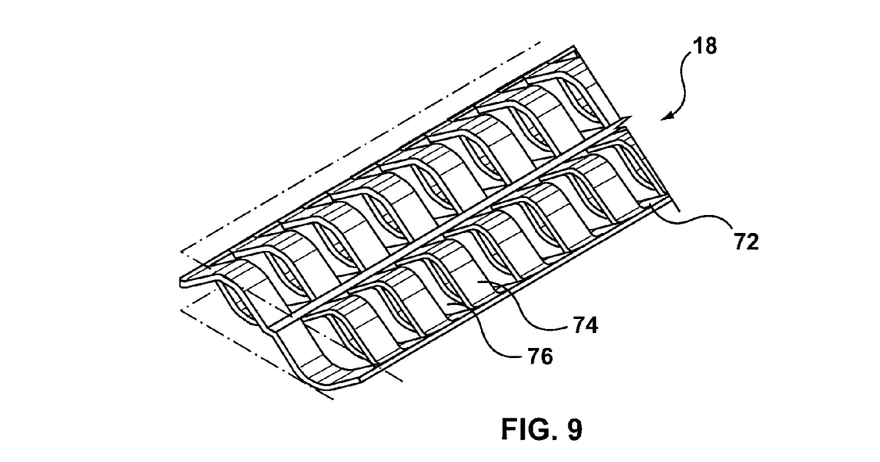
FIG. 9 is a perspective view of a fin plate used as a heat exchanger according to another example embodiment.

In one example embodiment, conformal heat exchanger 18 may be implemented using a formed plate 72 as shown in FIG. 9. The formed plate 72 includes successive rows of alternating sinusoidal strips 74, 76 formed in a single plate.

In another example embodiment, conformal heat exchanger 18 may be implemented using a bi-metallic mat, formed from 2 metals that have different thermal expansion characteristics such that the thickness of bi-metallic mat expands during heating, thereby increasing the contact force between the mat and the stack surfaces 26, 28.

Figure 10:
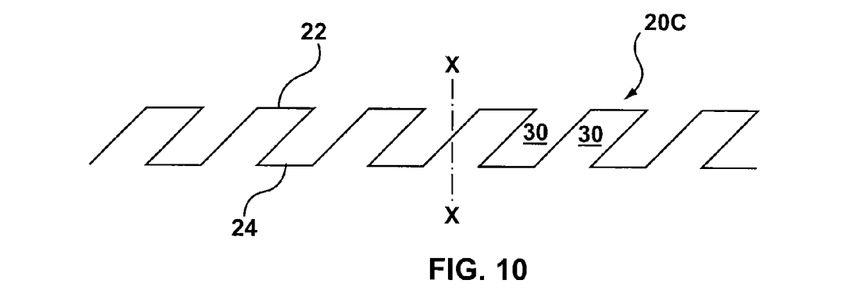
FIG. 10 is an end view of a fin plate used as a heat exchanger according to another example embodiment.

With reference to FIG. 10, another single fin plate configuration for implementing conformal heat exchanger 18 is illustrated as fin plate 20C which is similar to fin plate 20 discussed above except that the fins in fin plate 20C are cantered such that the spaces between the fin valleys on one side of the plate 20C are aligned with the spaces between the fin peaks on the opposite side of the plate 20C (e.g. are vertically aligned as indicated by line X-X in FIG. 10). The vertical alignment allows protrusions aligned on opposed stack surfaces 26, 28 to be accommodated in valleys of the fin plate 20C. This example embodiment of a fin plate 20C can substitute for back-to-back fin plates 20A and 20B, for example.

Figure 11A:
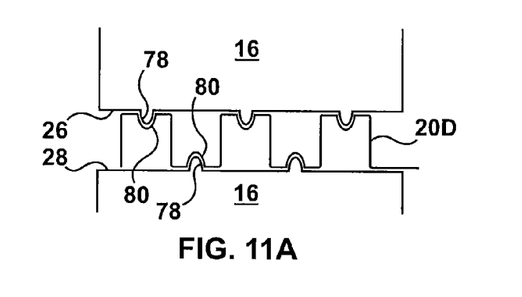
FIGS. 11A-11D are partial views illustrating mechanical interlocks that can be applied to fin plates in example embodiments.
Figure 11B:
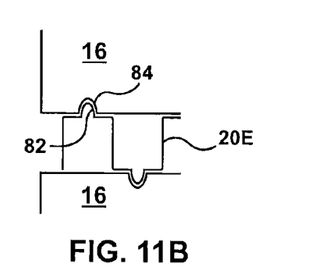
Figure 11C:
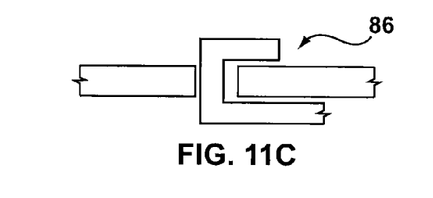
Figure 11D:
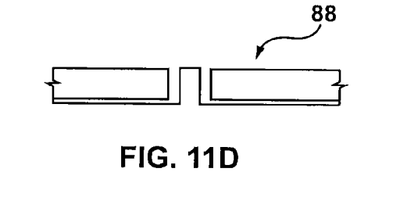

In some example embodiments, the fin plates used to implement heat exchanger 18 may include metallurgical or mechanical interlocks with each other or with the surfaces of battery modules 14 in order to reduce relative movement between the plates and the battery modules and mitigate against abrasion. By way of example, FIG. 11A and FIG. 11B both show respective single fin plates 20D and 20E that are similar to single fin plate 20 except that fin plate 20D includes grooves or receptacles 80 on its contact surfaces for receiving ridges or protrusions 78 located on battery module surfaces 26, 28 to create a mechanical interlock, and fin plate 20E includes ridges or protrusions 82 on its contact surfaces for extending into grooves or receptacles 84 located on battery module surfaces 26, 28 to create a mechanical interlock. Similar interlocks can be provided at inter-plate contact surfaces between back-to-back fin plate assemblies, as well as between fin plates and intermediate member 44. Other male/female mechanical interlocks between fin plates and between fin plates and battery module surfaces are possible as represented by the interlock systems 86 and 88 shown in FIGS. 11C and 11D.

In some example embodiments, the fin plates or intermediate members 44 used in the above described conformation heat exchanger configurations could include flange portions that extend beyond the edges of the battery stacks 12 and mounting holes and or additional heat exchange structures such as fins could be provided on the extending flange portions.

Figure 12:
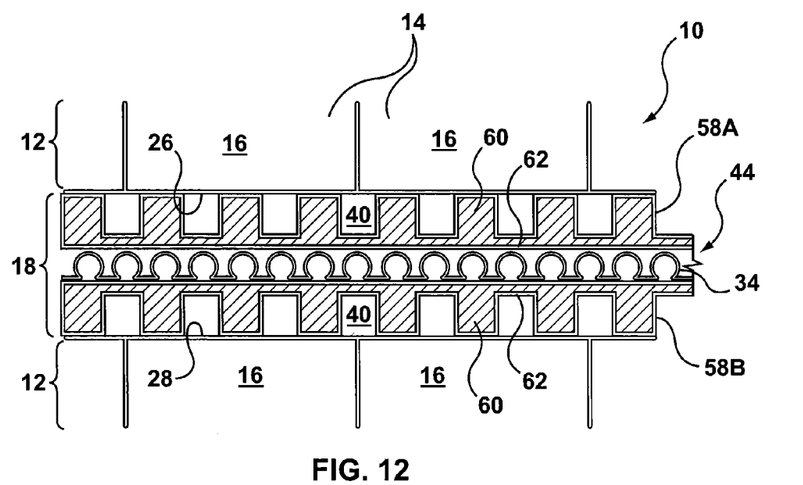
FIGS. 12 and 13 are each enlarged partial end views of battery units according to alternative example embodiments.

Another example embodiment of a fin structure for implementing inter-battery module conformal heat exchanger 18 is a pair of back-to-back graphite fin plates 58A, 58B as illustrated in FIG. 12. Each graphite fin plate 58A, 58B includes a central fin core 62 from which a plurality of fins 60 extend in opposite directions to contact battery stack surfaces 26, 28, respectively. Fluid flow passages 40 are defined between adjacent fins 60 on each fin plate 58A, 58B. In one example embodiment, a conformal structure such as any of the metal fin plates disclosed above is positioned as an intermediate member 44 between the back-to-back graphite fin plates 58A, 58B. By way of example, in FIG. 12 conformal metal "Omega" style fin plate 34 is located between the back-to-back graphite fin plates 58A, 58B to provide elasticity such that the fin plate 34 back-to-back graphite fin plates 58A, 58B collectively provide a dimensionally compliant heat exchange structure 18 in which the graphite fin plates 58A, 58B stay in contact with the respective battery stack surfaces 26, 28 throughout the temperature cycling that the battery unit 10 undergoes during its operation. Fluid flow passages 40 can be positioned to accommodated protrusions or disturbances located on the stack surfaces 26, 28. Graphite fin plates 58A, 58B may for example be formed from machined graphite that in at least some example embodiments is non-conductive to provide electrical isolation between the heat exchanger structure 18 and the battery stacks. In some example embodiments, the fins 60 of graphite fin plates 58A, 58B are cantered or angled in a manner similar to the fin plate of FIG. 10.

Figure 13:
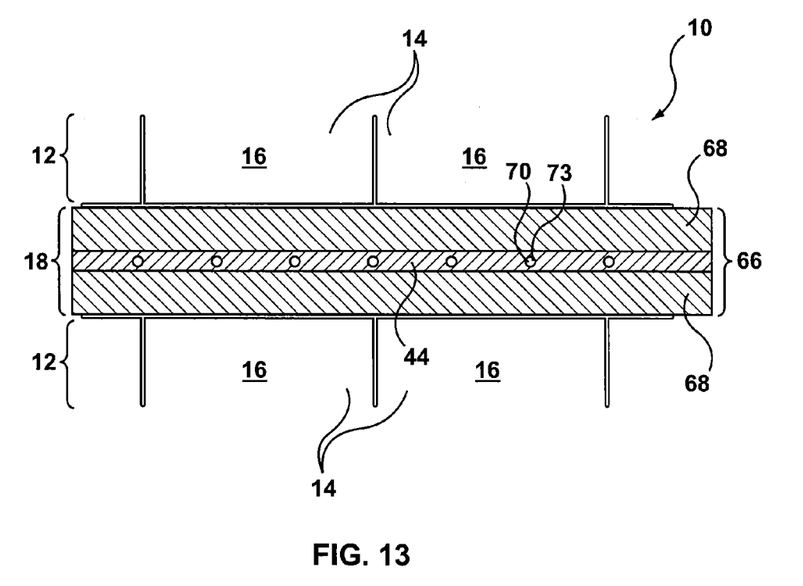

Another example embodiment of a fin structure for implementing inter-battery module conformal heat exchanger 18 is a graphite assembly 66 as illustrated in FIG. 13. Graphite assembly 66 includes intermediate member 44 that is sandwiched between a pair of packed graphite members 68 which in turn contact battery stack surfaces 26, 28. In one example embodiment, the packed graphite members 68 are configured to deform as they are compressed when the stacks 12 thermally expand during battery use, and subsequently return to their original shape as the stacks 12 thermally contract such that the packed graphite members 68 are continually in contact with respective surfaces 26 and 28 during the temperature cycles of the battery unit 10. The packed graphite members 68 may also be configured to accommodate protrusions on surfaces 26 and 28. In some example embodiments the central plate member 44 can include cavities or channels 70 that may for example be used for circuiting a cooling or heating fluid through the intermediate plate member 44. In some example embodiments, the intermediate plate member channels 70 could contain phase change material 73 that changes phase at a temperature within an operating temperature range of the battery unit 10. In some example embodiments the central plate member 44 could be a graphite plate with channels 70 being defined by metal tubes. In some example embodiments the intermediate member 44 is a conformal metal fin plate such as Omega fin plate 34 or any of the other metal fin plates discussed above.

In some example embodiments, in place of flat-sided corrugated fin plates 20A, 20B the back-to-back fin plate assembly 38 could be formed from plates having other configurations, for example plates 20C-20E, off-set fin plates 32, omega style fin plates 34, sinusoidal fin plates 36, formed plate 72, angled fin plate 20C or louvered plates, among other things can be arranged back-to-back with or without an intermediate member 44 to implement a double-fin plate assembly. In some example embodiments, louvered plates could be used in place of fin plates for either a single plate or back-to-back double plate conformal heat exchanger.

In some example embodiments, the planer intermediate member 44 could be used in combination with a single fin plate such as fin plates 20, 20A-20E, 32, 34 and 36 without a second fin plate.

In some example embodiments, the fluid flow passages (for example passages 30 in plate 20) through a plate can be interconnected to provide a single flow passage for a cooling liquid through the plate.

In some example embodiments the conformal heat exchanger configurations described above could be used between fuel cell modules in place of battery cell modules. Accordingly, the heat exchanger structures described herein can be used in a power producing unit that comprises a first stack comprising a plurality of power producing cells such as battery cell modules or fuel cell modules and a second stack comprising a plurality of power producing cells such as batter cell modules or fuel cell modules, the heat exchanger structure being disposed between opposing surfaces of the first stack and the second stack and defining one or a plurality of fluid flow passages, the heat exchanger structure being dimensionally compliant to compress under expansion of the first and second stacks and expand under subsequent contraction of the first and second stacks.

Accordingly, described herein are example embodiments of conformal exchangers for use between electrical power generating cells or modules. In at least some example embodiments single or back to back metal fin plates are used, such plates being constructed of thermally conductive and deformable materials such as, aluminum, aluminum alloy, copper, copper alloy, steel, stainless steel or spring steel. The plates are dimensionally compliant in that they can be deformed under compressive forces and then return to a former shape as the compressive forces decrease. The plates can be coated to electrically isolate them from the battery module surfaces that they contact. The fin plates are selected such that they can rebound to their original shape within load ranges, and maintain thermal contact with the battery modules at least during the normal temperature ranges that battery unit 10 is exposed to.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A battery unit comprising:
a first battery stack comprising a single row of battery modules that are arranged adjacent to and in contact with one another along a first direction, each of the battery modules comprising a rectangular substantially rigid box-like case housing one or more battery cells, wherein the case of each of the battery modules defines a top side, a bottom side and two pairs of lateral sides, each of the lateral sides is larger than the bottom side, and each of the battery modules is arranged such that a lateral side of one battery module is in contact with a lateral side of the adjacent battery module, the plurality of battery modules of the first battery stack defining a first battery stack side comprised of a series of adjacent surfaces formed by the bottom sides of said plurality of battery modules forming said first battery stack, the first battery stack side defining a first rectangle having a long dimension parallel to said first direction and a short dimension perpendicular to said first direction;
a second battery stack comprising a single row of generally rectangular and box-like battery modules that are arranged adjacent to and in contact with one another along said first direction, each of the battery modules comprising a rectangular substantially rigid box-like case housing one or more battery cells, wherein the case of each of the battery modules defines a top side, a bottom side and two pairs of lateral sides, each of the lateral sides is larger than the top side, and each of the battery modules is arranged such that a lateral side of one battery module is in contact with a lateral side of the adjacent battery module, the plurality of battery modules of the second battery stack defining a second battery stack side comprised of a series of adjacent surfaces formed by the top sides of said plurality of battery modules forming said second battery stack, the second battery stack side defining a second rectangle having a long dimension parallel to said first direction and a short dimension perpendicular to said first direction, wherein the second battery stack side is spaced apart from and opposes the first battery stack side; and
a heat exchanger structure disposed between the first battery stack side of the first battery stack and the second battery stack side of the second battery stack, the heat exchanger structure having a first side contacting the first battery stack side across said plurality of battery modules in said first stack, and having a second side contacting the second battery stack side across said plurality of battery modules in said second stack, the heat exchanger structure defining one or a plurality of fluid flow passages between the first battery stack side and the first side of the heat exchanger and between the second battery stack side and the second side of the heat exchanger, the heat exchanger being elastically deformable to compress under expansion of the first and second battery stacks and expand under subsequent contraction of the first and second battery stacks;
wherein the heat exchanger structure comprises a corrugated fin plate comprising a plurality of parallel corrugations defining alternating peaks and valleys, wherein the fluid flow passages are defined between the peaks and valleys, wherein at least the first side or the second side of the heat exchanger is defined by the peaks or the valleys of the corrugated fin plate;
wherein each of the parallel corrugations extends perpendicular to said first direction, and parallel to the short dimensions of the first and second rectangles defined by the respective first and second battery stack sides; and
wherein a non-electrically conductive material is located at the contact surfaces between the fin plate and the battery stack sides.

2. The battery unit of claim 1 wherein at least some of the peaks contacting the first battery stack side and at least some of the valleys contacting the second battery stack side to facilitate heat exchange between the fin plate and the first and second battery stacks.

3. The battery unit of claim 2 wherein each peak has a respective flat surface contacting the first battery stack side and each valley has a respective flat surface contacting the second battery stack side.

4. The battery unit of claim 3 wherein the fin plate corrugations are cantered such that at least some spaces between the peaks contacting the first battery stack side are aligned with respective spaces between valleys contacting the second battery stack side; and
wherein the flat surfaces of the peaks and valleys are joined by side walls which are sloped in the same direction relative to the peaks and valleys.

5. The battery unit of claim 2 wherein the fin plate is an off-set strip fin plate.

6. The battery unit of claim 1 wherein the heat exchanger structure comprises a fin plate defining rows of parallel semi-cylindrical portions joined by planar portions, all of the semi-cylindrical portions contacting the first battery stack side and all of the planar portions contacting the second battery stack side to facilitate heat exchange between the fin plate and the first and second battery stacks.

7. The battery unit of claim 1 wherein the heat exchanger structure comprises a corrugated first fin plate having alternating peaks and valleys and a deformable corrugated second fin plate having alternating peaks and valleys the first and second fin plates being located adjacent to each other with a plurality of the peaks of the first fin plate contacting the first battery stack side and a plurality of the peaks of the second fin plate contacting the second battery stack side; wherein the first and second fin plates are continuous and each extend across the plurality of battery modules in each of said first and second battery stacks.

8. The battery unit of claim 7 wherein the first fin plate and the second fin plate are arranged in back-to-back alignment with the valleys of the first fin plate being aligned with respective valleys of the second fin plate.

9. The battery unit of claim 7 wherein an intermediate plate is located between the first fin plate and the second fin plate.

10. The battery unit of claim 9 wherein the intermediate plate comprises an active heating element.

11. The battery unit of claim 9 wherein the intermediate plate comprises fluid conduits for conducting a fluid through the intermediate plate.

12. The battery unit of claim 9 wherein the intermediate plate encloses a phase change material having a phase change temperature falling within a normal operating temperature range of the battery unit.

13. The battery unit of claim 9 wherein the intermediate plate includes one or more extending portions that extend beyond an outer edge of the battery stacks.

14. The battery unit of claim 7 wherein protrusions extend from the first and second battery stack sides, the fin plates being positioned so that their respective valleys receive the protrusions.

15. The battery unit of claim 7 wherein the fin plates are formed from graphite with a conformal structure located therebetween.

16. The battery unit of claim 7 wherein the first and second fin plates are each elastically deformable.

17. The battery unit of claim 7 wherein the fin plates have valleys and peaks with flat contact surfaces or are sinusoidal fin plates.

18. The battery unit of claim 1 wherein cooperating interlock portions are provided on the heat exchanger structure and the battery stacks for limiting movement of the heat exchanger structure relative to the battery stacks.

19. A battery unit comprising:
a first battery stack comprising a single row of generally rectangular and box-like battery modules that are arranged adjacent to and in contact with one another along a first direction, each of the battery modules comprising a rectangular substantially rigid box-like case housing one or more battery cells, wherein the case of each of the battery modules defines a top side, a bottom side and two pairs of lateral sides, each of the lateral sides is larger than the bottom side, and each of the battery modules is arranged such that a lateral side of one battery module is in contact with a lateral side of the adjacent battery module, the plurality of battery modules of the first battery stack defining a first battery stack side comprising a series of adjacent surfaces formed by the bottom sides of said plurality of battery modules forming said first battery stack, the first battery stack side defining a first rectangle having a long dimension parallel to said first direction and a short dimension perpendicular to said first direction;
a second battery stack comprising a single row of generally rectangular and box-like battery modules that are arranged adjacent to and in contact with one another along said first direction, each of the battery modules comprising a rectangular substantially rigid box-like case housing one or more battery cells, wherein the case of each of the battery modules defines a top side, a bottom side and two pairs of lateral sides, each of the lateral sides is larger than the top side, and each of the battery modules is arranged such that a lateral side of one battery module is in contact with a lateral side of the adjacent battery module, the plurality of battery modules of the second battery stack defining a second battery stack side comprised of a series of adjacent surfaces formed by the top sides of said plurality of battery modules forming said second battery stack, the second battery stack side defining a second rectangle having a long dimension parallel to said first direction and a short dimension perpendicular to said first direction, wherein the second battery stack side is spaced apart from and opposes the first battery stack side; and
a heat exchanger structure disposed between the first battery stack side of the first battery stack and the second battery stack side of the second battery stack, the heat exchanger structure having a first side contacting the first battery stack side across said plurality of battery modules in said first stack and a second side contacting the second battery stack side across said plurality of battery modules in said second stack, the heat exchanger structure defining one or a plurality of fluid flow passages between the first battery stack side and the first side of the heat exchanger and between the second battery stack side and the second side of the heat exchanger, the heat exchanger being elastically deformable to compress under expansion of the first and second battery stacks and expand under subsequent contraction of the first and second battery stacks;
wherein the heat exchanger structure comprises a metal, corrugated first fin plate comprising a plurality of alternating peaks and valleys and a metal, deformable corrugated second fin plate comprising a plurality of alternating peaks and valleys, the first and second fin plates being located adjacent to each other with the valleys of the first fin plate being aligned with respective valleys of the second fin plate, a plurality of the peaks of the first fin plate contacting the first battery stack side and a plurality of the peaks of the second fin plate contacting the second battery stack side;
wherein each of the parallel corrugations of the corrugated first and second fin plates extends perpendicular to said first direction, and parallel to the short dimensions of the first and second rectangles defined by the respective first and second battery stack sides
wherein the first and second fin plates are continuous and each extends across the plurality of battery modules in each of said first and second battery stacks; and
an intermediate plate arranged between the first fin plate and the second fin plate.

* * * * *